US007231546B2

(12) United States Patent
Batchelor et al.

(10) Patent No.: US 7,231,546 B2
(45) Date of Patent: *Jun. 12, 2007

(54) APPARATUS AND METHOD TO OVERLAY (N) FIRST SECTORS ONTO (M) SECOND SECTORS USING A DATA QUEUE

(75) Inventors: Gary W. Batchelor, Tucson, AZ (US); Carl E. Jones, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 491 days.

This patent is subject to a terminal disclaimer.

(21) Appl. No.: 10/912,827

(22) Filed: Aug. 5, 2004

(65) Prior Publication Data

US 2006/0028948 A1    Feb. 9, 2006

(51) Int. Cl.
*G06F 11/00* (2006.01)

(52) U.S. Cl. .......................................... 714/22; 710/22

(58) Field of Classification Search .................. 714/22, 714/7, 9; 710/22
See application file for complete search history.

(56) References Cited

U.S. PATENT DOCUMENTS

| 5,315,691 | A | | 5/1994 | Sumiya et al. |
| 5,627,695 | A | * | 5/1997 | Prins et al. ................... 360/51 |
| 5,928,367 | A | | 7/1999 | Nelson et al. |
| 5,938,771 | A | | 8/1999 | Williams et al. |
| 5,940,862 | A | * | 8/1999 | Erickson et al. ............. 711/154 |
| 5,946,714 | A | * | 8/1999 | Miyauchi ..................... 711/205 |
| 6,000,018 | A | * | 12/1999 | Packer et al. ................ 711/154 |
| 6,357,028 | B1 | * | 3/2002 | Zhu ............................ 714/751 |
| 6,574,699 | B1 | * | 6/2003 | Dobbek ......................... 711/4 |
| 2002/0087786 | A1 | * | 7/2002 | Burton et al. ................ 711/112 |
| 2006/0028947 | A1 | * | 2/2006 | Elliott et al. .............. 369/53.41 |
| 2006/0028948 | A1 | * | 2/2006 | Batchelor et al. ......... 369/53.41 |
| 2006/0031601 | A1 | * | 2/2006 | Elliott et al. .................... 710/22 |
| 2006/0031630 | A1 | * | 2/2006 | Batchelor et al. ........... 711/112 |
| 2006/0031714 | A1 | * | 2/2006 | Batchelor et al. ............. 714/14 |

* cited by examiner

*Primary Examiner*—Dieu-Minh Le
(74) *Attorney, Agent, or Firm*—Chandler & Udall LLP; Dale F. Regelman

(57) ABSTRACT

A method to convert a plurality of sectors from a first sector format to a second sector format is disclosed. The method provides (N) contiguous first sectors comprising a first sector format to a sector format conversion device which includes a buffer and a data queue, where those (N) first sectors comprise a first number of bytes, and determines that (M) contiguous second sectors, comprising a second sector format, comprise at least the first number of bytes. The method overlays the (i)th first sector onto part or all of the (j)th second sector, and enqueues the newly-overlain (j)th second sector. The method then transmits the newly-overlain (j)th second sector to a data storage device, and writes that (j)th overlain second sector to an information storage medium.

13 Claims, 13 Drawing Sheets

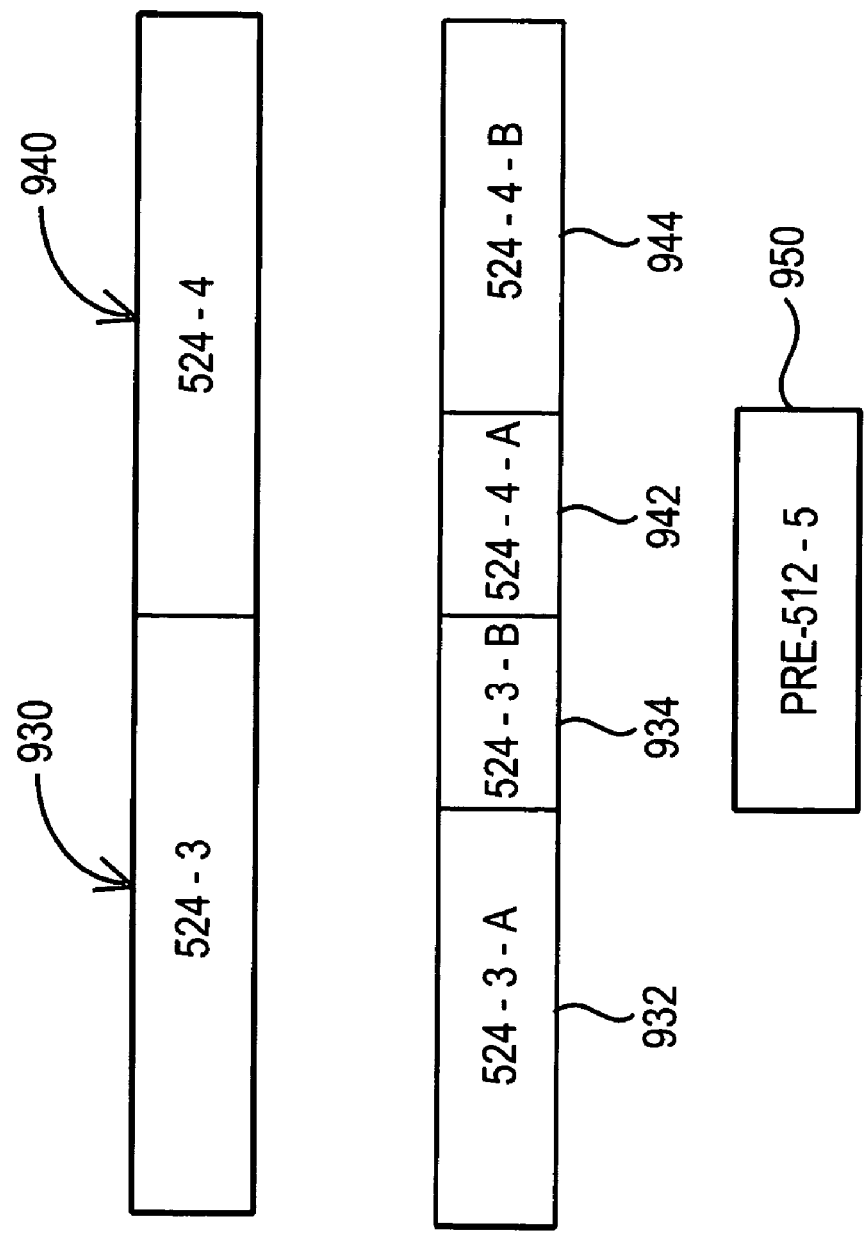

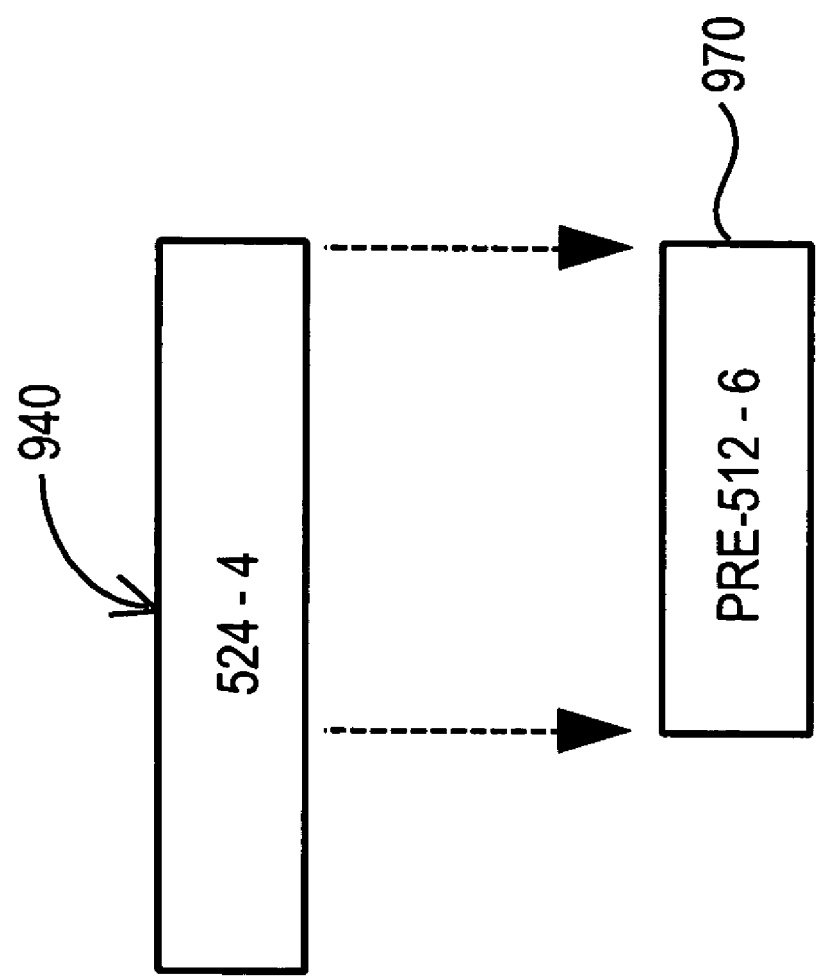

APPARATUS AND METHOD TO OVERLAY (N) FIRST SECTORS ONTO (M) SECOND SECTORS USING A DATA QUEUE

FIELD OF THE INVENTION

This invention relates to an apparatus and method to overlay (N) first sectors onto (M) second sectors using a data queue. In certain embodiments, Applicants' apparatus and method preserves data integrity during a power loss which interrupts the sector format conversion process.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

If the data disposed in the data cache were written in a first sector format, and if the data disposed in the one or more storage devices were written in a second sector format, then a sector format conversion device would be required. Applicants have found that what is needed is a sector format conversion device that both performs the sector format conversion process and that preserves data integrity during a power loss event. Applicants' apparatus and method preserve data integrity throughout the sector conversion process even during a power failure. In certain embodiments, Applicants' apparatus and method are compliant with the Power Failure Warning protocols under the SFF-8045 Specification.

SUMMARY OF THE INVENTION

Applicants' invention includes an apparatus and method to convert a plurality of sectors from a first sector format to a second sector format. The method provides an information storage and retrieval system which includes information comprising a plurality of first sectors written in a first sector format; a device controller; a data storage device, where that data storage device comprises an information storage medium comprising a plurality of second sectors each comprising a second sector format; a sector format conversion device comprising a buffer, a processor, and a data queue; a communication link interconnecting the sector format conversion device and the device controller, where the sector format conversion device is interconnected with the data storage device.

The method provides (N) contiguous first sectors to the sector format conversion device, where those (N) first sectors comprise a first number of bytes, and determines that (M) contiguous second sectors comprise at least the first number of bytes.

The method overlays the (i)th first sector onto part or all of the (j)th second sector, and enqueues the newly-formed (j)th overlain second sector. The method then transmits the (j)th overlain second sector to the data storage device, writes that (j)th overlain second sector to the information storage medium, and provides the (j)th write complete signal.

BRIEF DESCRIPTION OF THE DRAWINGS

The invention will be better understood from a reading of the following detailed description taken in conjunction with the drawings in which like reference designators are used to designate like elements, and in which:

FIG. 9B is a block diagram illustrating a step in Applicants' power failure warning algorithm;

FIG. 9D is a block diagram illustrating a step in Applicants' power failure warning algorithm.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapters, a plurality of device adapters, and a data cache. The following description of Applicant's method to convert data from a first sector format to a second sector format is not meant, however, to limit Applicant's invention to data processing applications, as the invention herein can be applied to sector format conversion in general.

Figure 1:
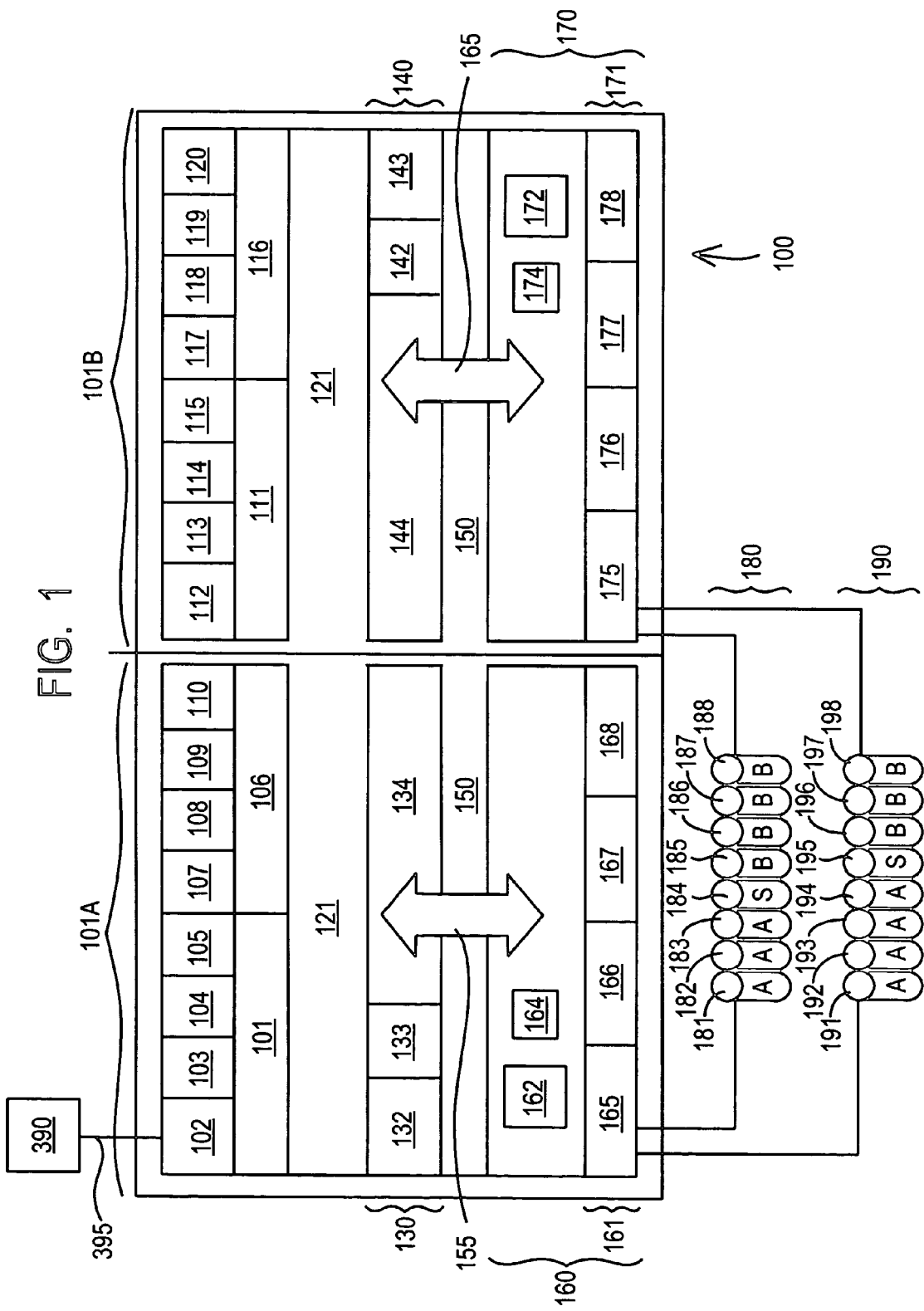
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a plurality of host adapters 102–105, 107–110, 112–115, and 117–120, disposed in four host bays 101, 106, 111, and 116. In other embodiments, Applicants' information storage and retrieval system includes fewer than 16 host adapters. Regardless of the number of host adapters disposed in any embodiments of Applicants' system, each of those host adapters comprise a shared resource that have equal access to both central processing/cache elements 130 and 140. Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, processor portion 130, and one or more device adapters, are packaged together on a single card disposed in Applicants' information storage and retrieval system. Similarly, in certain embodiments, one or more host adapters, processor portion 160, and one or more device adapters, are disposed on another card disposed in Applicants' information storage and retrieval system. In these embodiments, Applicants' system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicants' information storage and retrieval system includes more than two storage device arrays. Each storage array appears to a host computer as one or more logical devices.

In certain embodiments, one or more of the data storage devices comprise a plurality of hard disk drive units. In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicants' system includes a single storage device array. In yet other embodiments, Applicants' system includes more than two storage device arrays.

Figure 2:
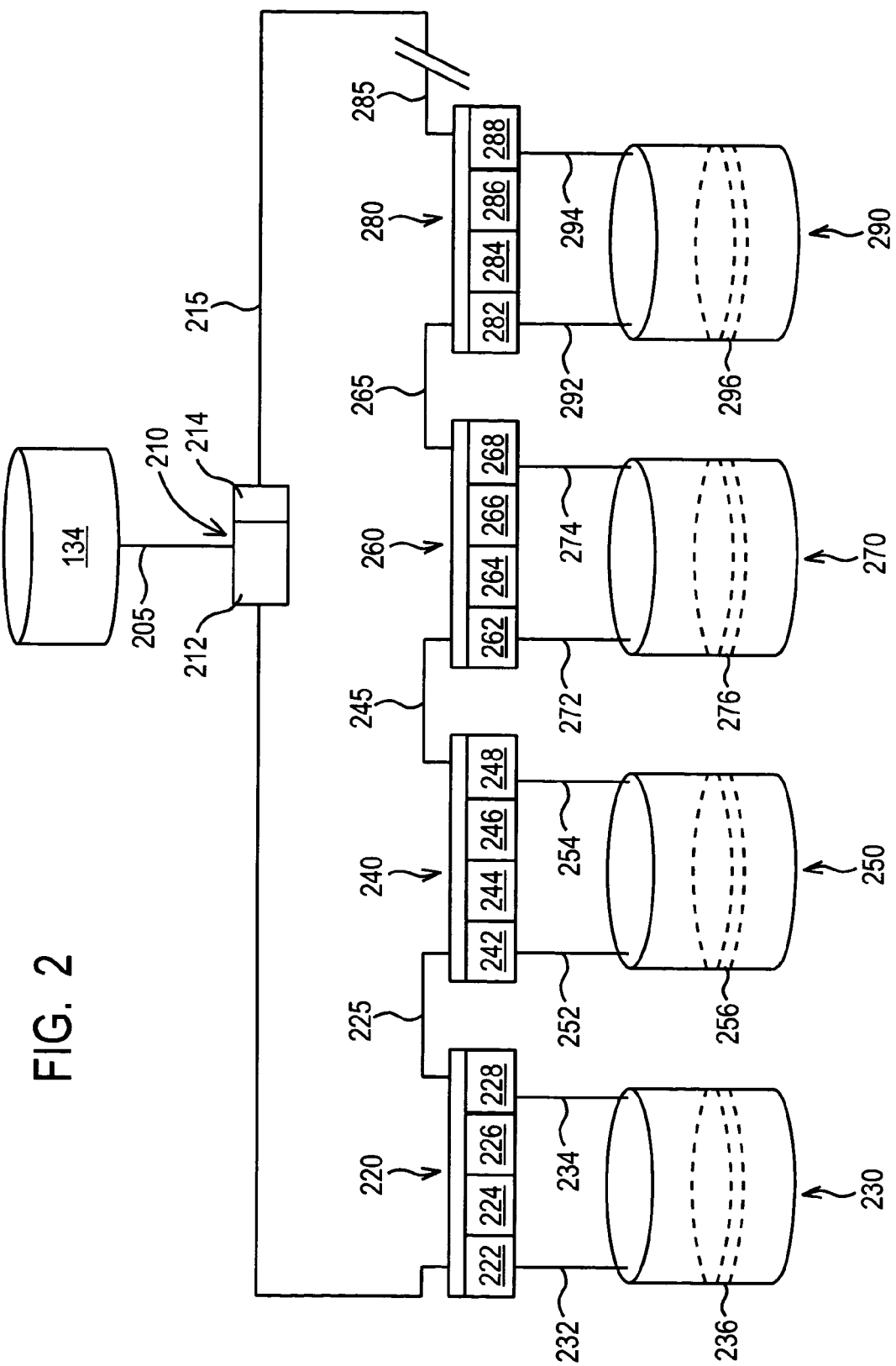
FIG. 2 is a block diagram showing a plurality of sector format conversion devices interconnecting a plurality of data storage devices to a controller.

Referring now to FIG. 2, regardless of the data storage media used in Applicants' information storage and retrieval system, e.g. a plurality of hard disks, each data storage device, which includes one or more of those storage media, is interconnected to a device controller 210 by a communication link 215. In certain embodiments, controller 210 includes a processor 212 and a memory 214. In certain embodiments, memory 214 comprises non-volatile memory.

In certain embodiments, device controller 210 comprises a device adapter, such as for example device adapter 165 (FIG. 1). In certain embodiments, device controller 210 comprises a RAID controller. In certain embodiments, communication link 215 comprises a Fibre Channel Arbitrated Loop. In the illustrated embodiment of FIG. 2, communication link 215 includes link segments 225, 245, 265, and 285.

The loop structure shown in FIG. 2 comprises one embodiment of Applicant's system. In other embodiments, link 215 comprises a switched fabric or a combination of a switch and loop topologies. In other embodiments, link 215 comprises dual FC-AL loops of switches where the device controller 210 is connected to two FC-AL loops. Each loop contains one or more Fibre Channel switches. The conversion devices 220, 240, etc connect point to point to switches on each loop. In other embodiments, each loop contains a single conversion device that performs a switching function that surfaces multiple point to point devices on each loop.

In some embodiments the conversion device, includes elements to perform sector size conversion from a first sector format to a second sector format ("sector size conversion"), where the communication protocol is the same for the first sector format and the second sector format. In other embodiments, the conversion device includes elements to perform both "sector size conversion" and a conversion from a first communication protocol to a second communication protocol ("protocol conversion"). In some embodiments the first communication protocol is a Fibre Channel Protocol and the second communication protocol is Serial ATA or ATA. In other embodiments, the first communication protocol is Serial Attached SCSI and the second communication protocol is Serial ATA or ATA.

In all embodiments, Applicants' sector format conversion device is capable of sector size conversion. In certain embodiments, Applicants' sector format conversion device is also capable of protocol conversion. References herein to sector format conversion device include Applicants' devices capable of sector format conversion, and also to Applicants' devices capable of sector format conversion and protocol conversion.

Each storage device is interconnected to communication link 215 by a sector format conversion device, such as devices 220, 240, 260, and 280, which interconnect storage devices 230, 250, 270, and 290, respectively, to communication loop 215. Sector format conversion device 220 interconnects storage device 230 to loop 215 by communication link 232.

Communication link 225 interconnects sector format conversion device 220 and sector format conversion device 240. Sector format conversion device 240 interconnects storage device 250 with loop 215 by communication link 252. Communication link 245 interconnects sector format conversion device 240 and sector format conversion device 260. Sector format conversion device 260 interconnects storage device 270 to loop 215 by communication link 272.

Communication link 265 interconnects sector format conversion device 260 and sector format conversion device 280. Sector format conversion device 280 interconnects storage device 290 to loop 215 by communication link 292. Communication link 285 interconnects sector format conversion device 280 and communication loop 215. Communication links 232, 252, 272, and 292, are individually selected from a native drive line such as ATA or S-ATA.

Each sector format conversion device includes a data buffer, such as data buffers 222, 242, 262, and 282. Each sector format conversion device further includes a processor, such as processor 224, 244, 264, and 284. Each sector format conversion device further includes a persistent memory, such a persistent memory 226, 246, 266, and 286. By persistent memory, Applicants mean non-volatile memory, i.e. memory that survives a loss of utility power. In certain embodiments, nonvolatile memory devices 226, 246, 266, and 286, are each individually selected from the group which includes one or more EEPROMs (Electrically Erasable Programmable Read Only Memory), one or more flash memories, battery backup RAM, hard disk drive, combinations thereof, and the like.

In certain embodiments, data received from one or more host computers is initially written to a data cache, such as for example data cache 134 (FIG. 1), disposed in Applicants' information storage and retrieval system, such as system 100 (FIG. 1). In certain embodiments, that data is written to the data cache using a first sector format. In certain embodiments, a host computer writes the data to the storage subsystem using a block storage protocol over link 395 using a sector size other than the native sector size of the disk. In other embodiments, the storage subsystem adds its own data to the data written by the host to generate is own sector size. This is done by prepending and/or appending data to the sector for cases where the host is using a blocked based protocol like SCSI or by breaking a record based data such as ECKD data formats used by zSeries systems into fixed block sectors In certain embodiments, that first sector format comprises 520 bytes of data per sector. In certain embodiments, that first sector format comprises 524 bytes of data per sector. In certain embodiments, that first sector format comprises 528 bytes of data per sector. In certain embodiments of Applicants' method, before providing data to one or more attached storage devices, converts data from the afore-described first sector format to a second sector format. In certain embodiments, that second sector format comprises 512 bytes of data per sector.

In certain embodiments of Applicants' method, the conversion of data from a first sector format to a second sector format is performed by a sector format conversion device, such as for example sector format conversion device 220. Thus, sector format conversion device 220 receives data in the first sector format, converts that data into the second sector format, and then provides that second sector format data to the attached storage device. In certain embodiments, sector format conversion device receives data in the first sector format from a data cache, such as for example data cache 162 (FIG. 1). In certain embodiments, sector format conversion device receives data in the first sector format from a host computer interconnected with Applicants' information storage and retrieval system, such as for example host computer 390 (FIG. 1).

Figure 3:
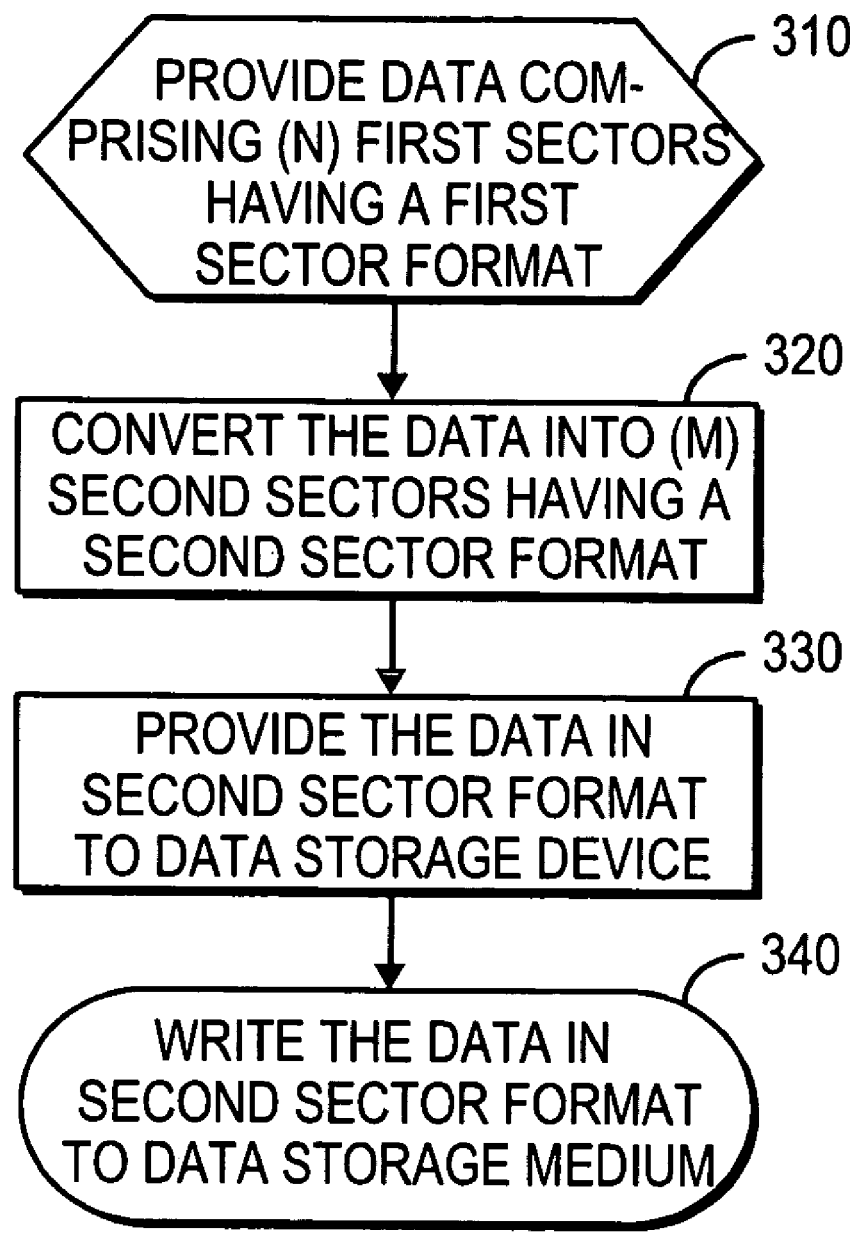
FIG. 3 is a flow chart summarizing Applicants' method.

FIG. 3 summarizes the steps of Applicants' method to convert data from a first sector format to a second sector format. In step 310, Applicants' method provides data comprising (N) first sectors, where each of those (N) first sectors comprise a first sector format. In certain embodiments, that first sector format comprises 520 byte sectors. In other embodiments, that first sector format comprises 524 byte sectors. In still other embodiments, that first sector format comprises 528 byte sectors.

In certain embodiments, the data comprising (N) first sectors is provided to a sector format conversion device, such as device 220 (FIG. 2) disposed in an information storage and retrieval system, such as for example system 100 (FIG. 1), by one or more host computers, such as for example host computer 390 (FIG. 1). In certain embodiments, the data comprising (N) first sectors is provided to a sector format conversion device, such as device 220 (FIG. 2) disposed in an information storage and retrieval system, such as for example system 100 (FIG. 1), from a data cache disposed within that same information storage and retrieval system, such as for example data cache 162 (FIG. 1).

In step 320, Applicants' method converts the data comprising (N) first sectors to data comprising (M) second sectors, where each of the (M) second sectors comprises a second sector format. In certain embodiments, step 320 is performed by a sector format conversion device, such as device 220 (FIG. 2). As those skilled in the art will appreciate, if the first sector format comprises (X) bytes per sector and if the second sector format comprises (Y) bytes per sector, where (X) is greater than (Y), then (N) is less than (M). Alternatively, if (X) is less than (Y), then (N) is greater than (M).

Figure 4:
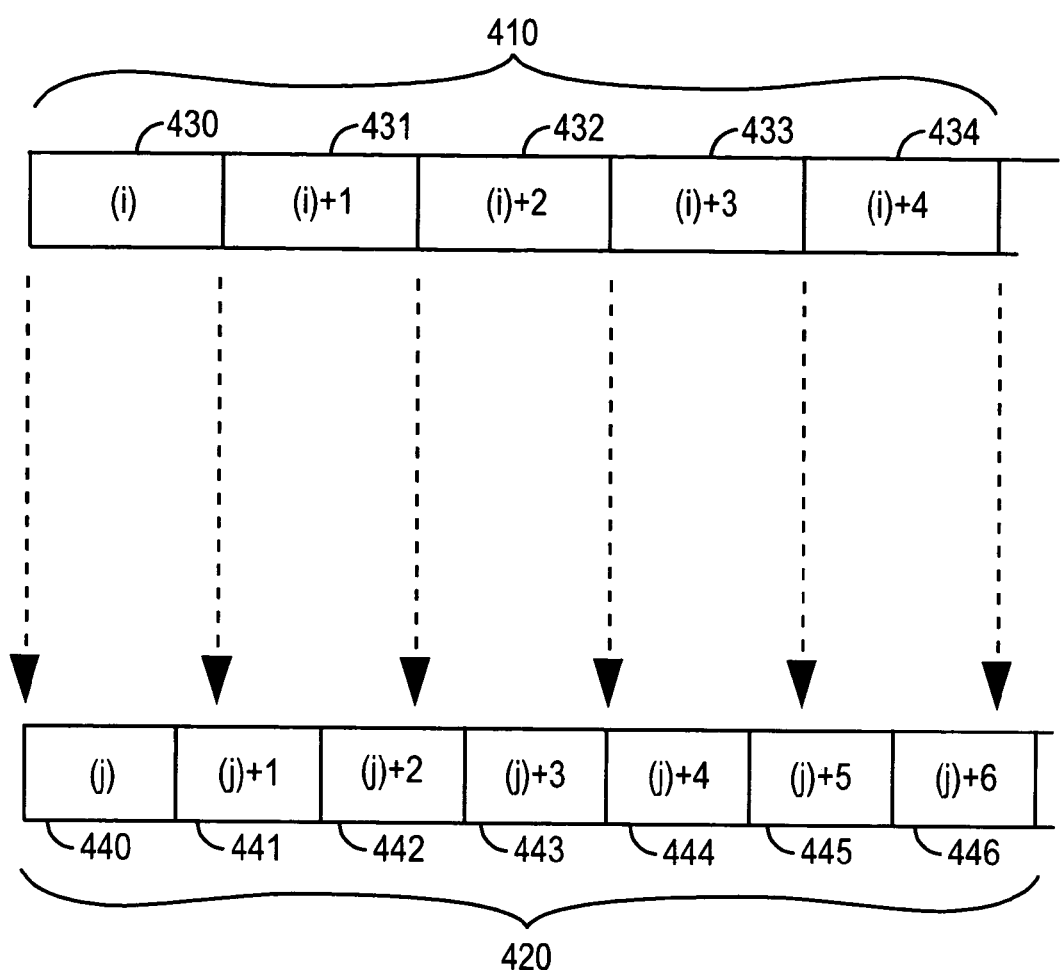
FIG. 4 shows the mapping of a plurality of first sectors having a first sector format onto a plurality of second sectors having a second sector format.

In certain embodiments Applicants' method in step 320 converts data from the first sector format to data comprising the second sector format using an overlay operation. Referring now to FIGS. 3 and 4, in step 310 Applicants' method provides a plurality of first sectors comprising first data, i.e. data 410, comprising a first sector format. FIG. 4 shows data 410 comprising first sectors 430, 431, 432, 433, and 434. First data 410 is shown comprising 5 first sectors for clarity of description. In actual implementation, first data 410 may comprise thousands or more of sectors in the first sector format.

Thus, first data 410 comprises a plurality of first sectors, where that plurality of first sectors are contiguous. By "contiguous," Applicants' mean that the (i)+1th first sector, i.e. first sector 431, is contiguous with both the (i)th first sector, i.e. first sector 430, and the (i)+2th first sector, i.e. first sector 432.

In step 320, Applicants' method maps first data 410 comprising a plurality of sectors of data written in the first sector format into second data 420 comprising a plurality of sectors of data written in the second sector format by overlaying first data 410 onto a sufficient number of second sectors to form data 420. To illustrate, if in step 310 Applicants' method provides (N) contiguous first sectors, where those (N) first sectors comprise a first number of bytes, then in step 320 Applicants' method determines that (M) contiguous second sectors comprise at least that first number of bytes.

Figure 5:
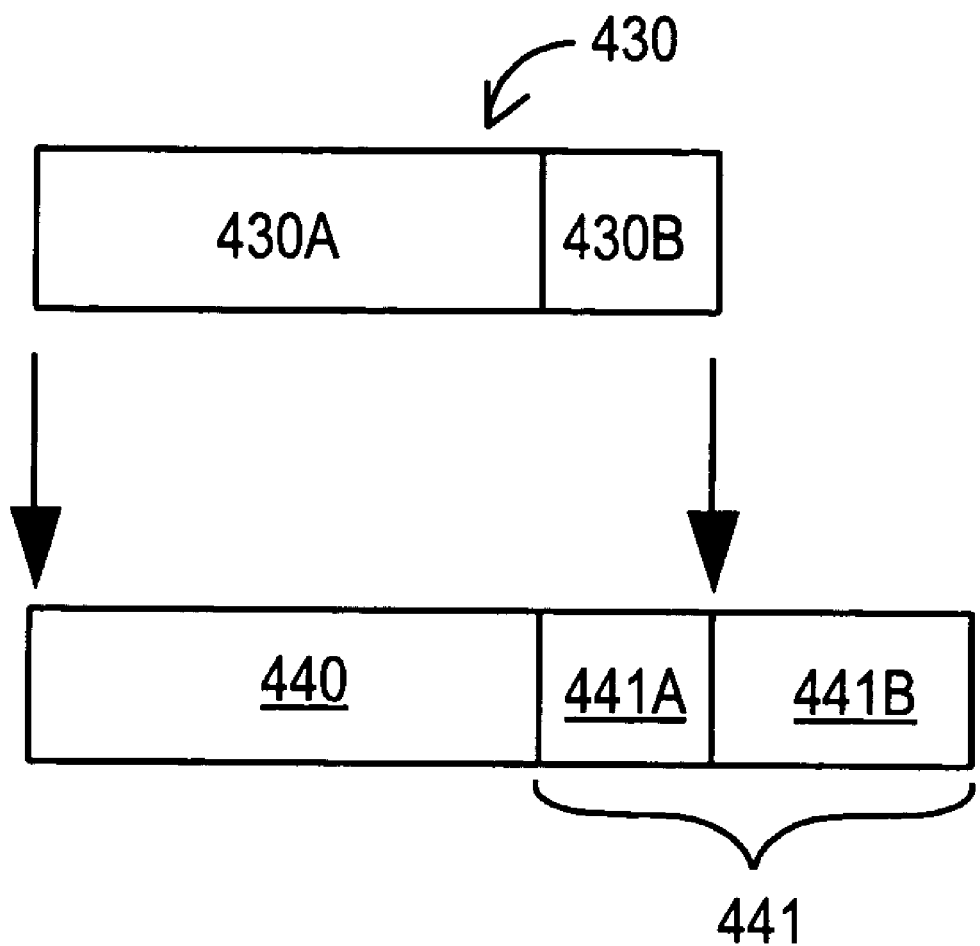
FIG. 5 shows the mapping of a single first sector onto two second sectors.

In certain embodiments, to maintain the integrity of both the new and pre-existing ("unmodified") data of the first sector format, when performing the overlay of the first sector format on to the second sector format, Applicants' method pre-fetches the pre-existing data from the storage device, in second sector format, where the overlain second sector, i.e. the converted second sector, will include both new and unmodified data after the sector format conversion is completed. For example and referring to FIG. 5, when sector portion 430B of first sector 430 is overlaid onto pre-existing second sector 441, the newly-formed overlain second sector 441 will comprise "new" data 441A and "pre-existing" data 441B. For purposes of this Application, "converted second sector" and "overlain second sector" both refer to a pre-existing second sector which has been overlaid with a part or all of one or more first sectors.

In the illustrated embodiment of FIG. 4, the first sector format comprises (X) bytes per sector, and the second sector format comprises (Y) bytes per sector, where (X) is greater than (Y). In certain embodiments, (X) is about 524 and (Y) is about 512. In the illustrated embodiment of FIG. 4, 5 sectors of data having data written in the first sector format, namely sectors 430, 431, 432, 433, and 434, are mapped in step 320 into 7 sectors of data written in the second sector format, namely sectors 440, 441, 442, 443, 444, 445, and 446. In certain embodiments, Applicants' method prefetches the first and last second sectors, namely second sector 440 and second sector 446, of the contiguous second sectors 440 through 446, inclusive. Because the overlay operation of step 320 might leave pre-existing data intact on a portion of second sector 440, and because the overlay operation may leave certain pre-existing data intact on second sector 446, those beginning and ending sectors are pre-fetched.

Referring again to FIG. 3, in step 330 Applicants' method provides the plurality of overlain second sectors comprising data 420, in second sector format, to a storage device. In certain embodiments, step 330 is performed by a sector format conversion device, such as device 220 (FIG. 2), and in step 330 that sector format conversion device provides the data in second sector format to an attached storage device, such as storage device 230 (FIG. 2).

In step 340, the attached storage device writes the plurality of overlain second sectors, in second sector format, to a storage medium disposed in the data storage device. In certain embodiments, the data storage medium is removeable disposed in the data storage device, i.e. a portable cartridge comprising a magnetic tape removeably disposed within a tape drive. In other embodiments, the storage medium is permanently disposed within the storage device, such as a hard disk disposed within a hard disk drive unit.

In certain embodiments, the first data of step 310 is stored in a buffer, such as buffer 222, disposed within Applicants' sector format conversion device, such as device 220. In certain embodiments, in step 330 the converted data is provided to the storage device substantially synchronously with the data conversion of step 320. In other embodiments, the converted data is written to a buffer in the sector format conversion device for later transmission to the storage device.

Figure 6:
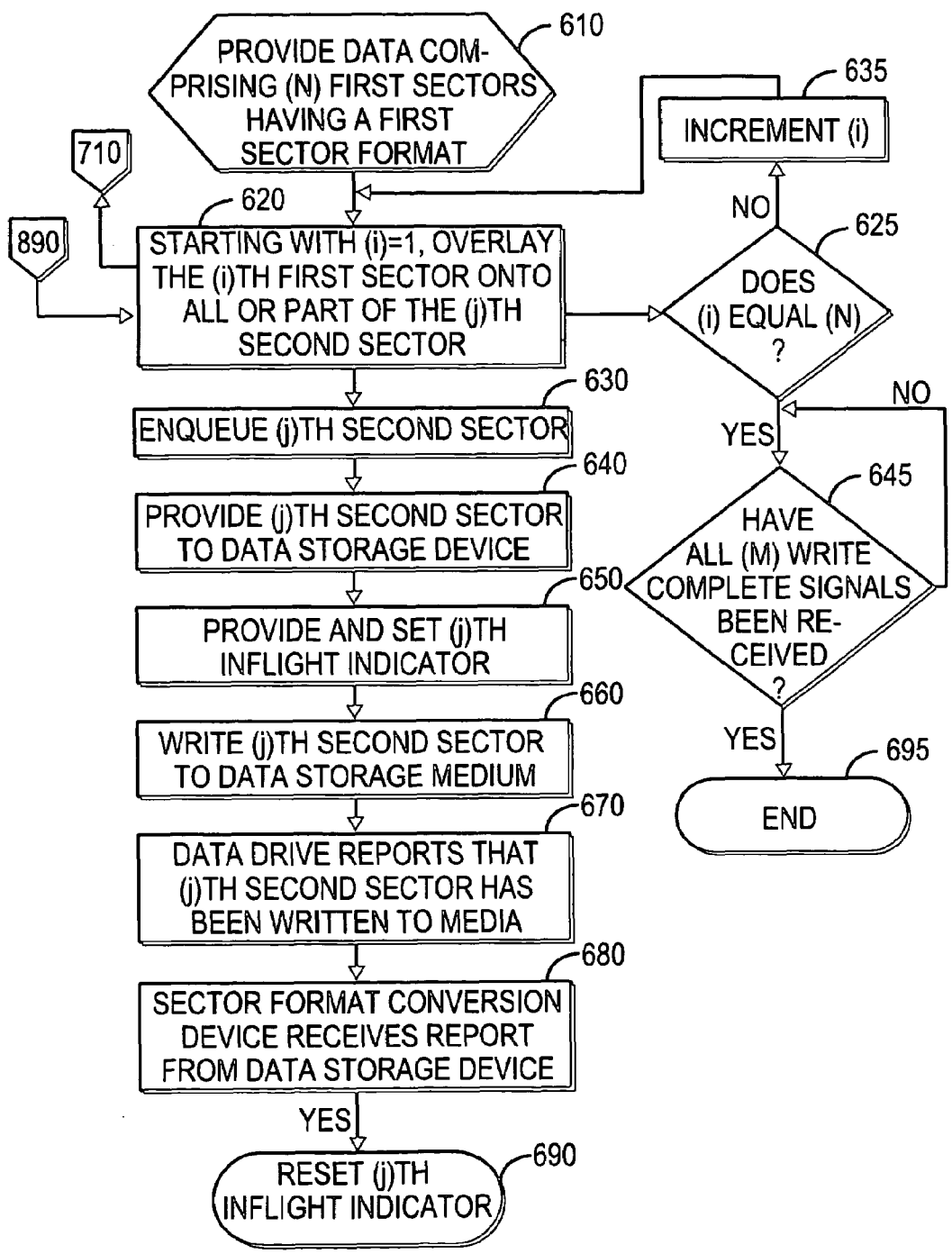
FIG. 6 is a flow chart summarizing the initial steps of Applicants' method.

In certain embodiments, the method of FIG. 3 is implemented using the steps shown in FIG. 6. In these embodiments, Applicants' method maps the first data into the second data sequentially starting with the initial first sector of that first data and proceeding seriatim until the final first sector of the first data has been converted into the second sector format.

Referring now to FIG. 6, in step 610 Applicants' method provides (N) first sectors having a first sector format to a sector format conversion device. In certain embodiments, in step 410 a device controller, such as controller 210 (FIG. 2) retrieves the (N) first sectors from a data cache, such as data cache 134 (FIGS. 1, 2). In certain embodiments, the receiving sector format conversion device stores the (N) first sectors in a buffer, such as for example buffer 222 (FIG. 2).

In step 620, Applicants' method overlays the (i)th first sector, where (i) is initially set to 1, onto all or part of the (j)th second sector. In certain embodiments, step 420 is performed by a sector format conversion device, such as device 220 (FIG. 2).

In the illustrated embodiment of FIG. 4, step 420 includes overlaying the (i)th first sector, i.e. first sector 430, onto the (j)th and onto a portion of the (j)+1th second sectors, i.e. second sectors 440 and 441. In Applicants' process of overlaying the (i)th first sector onto the (j)th and the (j)+1th second sectors, the method may create a second sector with a portion of the "pre-existing" data that was "pre-fetched" from the storage medium to maintain the alignment and integrity of the data of the first sector format. For example and referring now to FIG. 5, overlaying first sector 430 onto second sectors 440 and 441 causes second sector 440 to comprise "new data" derived from sector portion 430A of first sector 430, and causes second sector 441 to comprise "new data" portion 441A derived from portion 430B of first sector 430. Sector portion 441B comprises "pre-existing" data previously written to second sector 441. Applicants' method transitions from step 620 to steps 625 and 630.

In step 630, Applicants' method enqueues the (j)th second sector, and optionally the (j)+1th second sector, overlain in step 620 by first sector 430. In certain embodiments, step 630 includes enqueuing one or more overlain second sector in a queue, such as queue 228, disposed in a sector format conversion device, such as device 220. In certain embodiments, step 630 is performed by a sector format conversion device, such as device 220.

In step 640, Applicants' method provides the (j)th overlain second sector, formed in step 620, from the queue, such as queue 228, to a target data storage device, such as data storage device 230. In certain embodiments, step 640 is performed by a sector format conversion device, such as device 220.

In step 650, Applicants' method provides and sets the (j)th Inflight Indicator to indicate that the (j)th second sector is In Flight. For purposes of this Application, an "In Flight" second sector is an overlain second sector provided to a target data storage device for which a write complete signal has not yet been received. In certain embodiments, step 650 is performed by a sector format conversion device, such as device 220.

In certain embodiments, Applicants' method creates a discrete Inflight Indicator for each overlain second sector provided to a data storage device. In certain embodiments, Applicants' Inflight Indicator comprises a flag which can be turned on or off. In certain embodiments, such a flag is disposed in device microcode disposed in the sector format conversion device. In certain embodiments, Applicants' Inflight Indicator comprises a bit which can be set to either "0" or to "1". In certain embodiments, such a bit is disposed in device microcode disposed in the sector format conversion device. Further in step 650, Applicants' method sets the (j)th Inflight Indicator, i.e. the Inflight Indicator associated with the (j)th overlain second sector, to show that the (j)th overlain second sector is "In Flight." In certain embodiments, step 650 is performed by a sector format conversion device, such as device 220.

In certain embodiments, steps 640 and 650 are performed substantially synchronously. In other embodiments, step 640 precedes step 650. In yet other embodiments, step 650 precedes step 640.

In step 660, the target data storage device, such as data storage device 230, receives the (j)th overlain second sector and writes that (j)th overlain second sector to a data storage medium disposed therein, such as data storage medium 236.

In step 670, the target data storage device reports that the (j)th overlain second sector has been written to media. This reporting may comprise any signaling method known to those of skill in the art. For example, the target data storage drive may be coupled to the issuing sector format conversion device through a communication interface. In certain embodiments, the target data storage drive provides a write complete signal to the issuing sector format conversion device. Alternatively, in certain embodiments the issuing sector format conversion device polls the target data storage device to ascertain the status of the (j)th overlain second sector.

In step 680, Applicants' sector format conversion device receives the report from the target data storage device that the (j)th overlain second sector has been written to media. In certain embodiments, steps 670 and 680 occur substantially synchronously.

In step 690, Applicants' method resets the (j)th Inflight Indicator to show that the (j)th overlain second sector has been written to media. In certain embodiments, step 690 includes deleting the (j)th Inflight Indicator. In other embodiments, step 690 includes setting the (j)th In Flight bit from a "1" to a "0". In yet other embodiments, step 890 includes turning off the (j)th Inflight Indicator flag.

In step 625, Applicants' method determines if all the (N) first sectors have been overlaid on the requisite number of second sectors, i.e. if (i) equals (N). If Applicants' method determines in step 625 that (i) does not equal (N), i.e. certain data in the first sector format remains to be converted into the second sector format, then the method transitions from step 625 to step 635 wherein the method increments (i). Applicants' method transitions from step 635 to step 620 and continues as described above.

If Applicants' method determines in step 625 that (i) equals (N), then the method transitions from step 625 to step 645 wherein the method determines if all the overlain second sectors have been written to media, i.e. if (M) write complete signals have been received. If Applicants' method determines in step 645 that all the overlain second sectors have not yet been written to media, then the method continues to monitor whether all the overlain second sectors have been written to media. Alternatively, if Applicants' method determines in step 645 that all the overlain second sectors have been written to media, then the method transitions from step 645 to step 695 and ends.

Applicants' method of FIG. 6 performs a plurality of steps synchronously. For example, a first sector is overlaid onto a second sectors in step 620, while at the same time previously overlain second sectors are enqueued in step 630, while at the same time overlain second sectors are being provided to one or more data storage devices in step 640, while at the same time previously-received overlain second sectors are being written to one or more storage media in step 660 by one or more data storage devices, while at the same time in step 670 one or more data storage devices are providing write complete signals, while at the same time in step 680 sector format conversion devices are receiving signals from the data storage devices, while at the same time one or more Inflight Indicators may be being reset.

Applicants' method to convert data from a first sector format into data comprising a second sector is compliant with Section 6.4.8.2., entitled "Power Failure Warning," of SFF Specification SFF-8045 (hereinafter referred to as the "PFW Specification," which is hereby incorporated by reference. As those skilled in the art will appreciate, the SFF Committee is an ad hoc group formed to address disk industry needs in a prompt manner. When formed in 1990, the original goals were limited to defining de facto mechanical envelopes for disk drives so they could fit into laptop computers and other small products. In November 1992, the SFF Committee objectives broadened to encompass other areas which needed prompt industry action. SFF Specifications are narrow in scope, to reduce development time. Among other requirements, the PFW Specification mandates that when write caching, a data storage device must stop writing data to nonvolatile storage on a block boundary.

In certain embodiments, one or more of Applicants' data storage devices, such as for example data storage device 230, comprises what is sometimes referred a "S-ATA" device. As those skilled in the art will appreciate, a S-ATA device employs a Serial ATA disk-interface technology.

S-ATA is based upon serial signaling technology. Serial ATA is a point-to-point connection and allows multiple ports to be aggregated into a single controller, such as for example controller 210 (FIG. 2). S-ATA storage devices do not necessarily support the PFW Specification. Applicants' method is PFW Specification compliant, even when using one or more S-ATA storage devices.

In the event a PFW signal is received by Applicants' apparatus while converting data from a first sector format to a second sector format, Applicants' method transitions to a PFW algorithm. Using that PFW algorithm, after receiving a PFW signal, Applicants' method creates and saves two additional second sectors, and saves those two second sectors before the onset of the power loss event.

Figure 7:
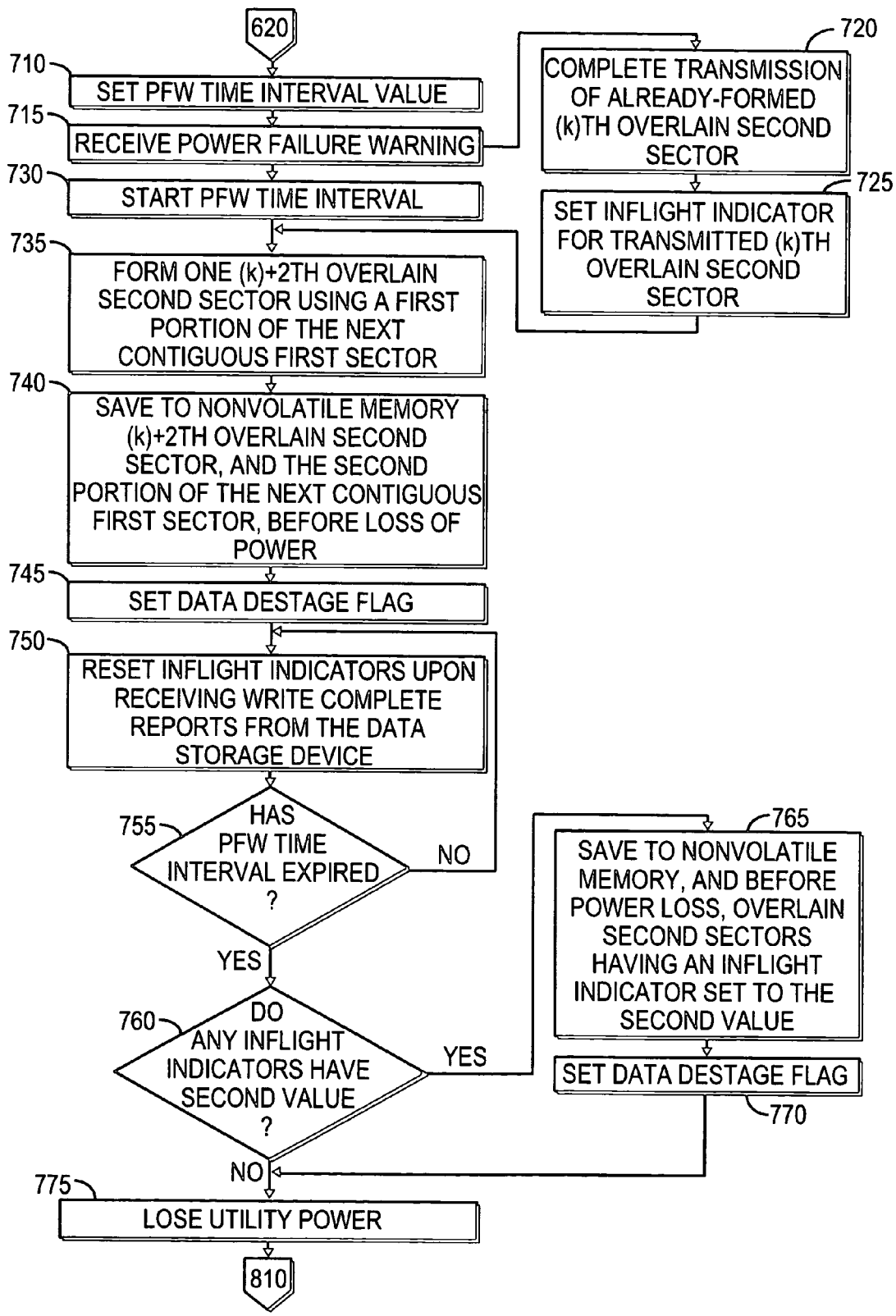
FIG. 7 is a flow chart summarizing the initial steps in Applicants' power failure warning algorithm.

In the event Applicants' apparatus generates and/or receives a PFW signal while performing the method of FIG. 6, Applicant's method transitions to Applicants' PFW algorithm. Applicants' PFW algorithm is summarized in FIGS. 7 and 8. Referring now to FIGS. 6 and 7, Applicants' method transitions to step 710 upon detection of a PFW signal. Step 715 recites receiving that PFW signal.

FIG. 6 shows Applicants' method transitioning from step 620 to step 710. As noted above, Applicants' method may be performing steps 620, 625, 630, 635, 640, 645, 650, 660, 670, 680, and/or 690, synchronously. If any one or more of steps 620, 625, 630, 635, 640, 645, 650, 660, 670, 680, and/or 690, are being performed and a PFW signal is received, Applicants' method transitions to step 710.

In step 710, Applicants' method sets a power failure warning time interval. The PFW Specification requires, inter alia, that full power be provided to the one or more data storage devices for at least 4 milliseconds after assertion of the PFW signal. In certain embodiments of Applicants' method, the PFW time interval is set to be less than 4 milliseconds. In certain embodiments, Applicants' method sets the PFW time interval to be about 3 milliseconds. During this PFW time interval, Applicants' method completes the in-progress transmission of an already-converted DMA payload while providing as many converted DMA data payloads as possible to one or more data storage devices.

In the illustrated embodiment of FIG. 6, step 710 is shown preceding receipt of a PFW signal in step 715. In certain embodiments, step 710 may be performed at any time before receipt of a PFW signal. In certain embodiments, the PFW time interval is encoded in firmware disposed in Applicants' sector format conversion device. In certain embodiments, the PFW time interval is set during system startup. In certain embodiments, the PFW time interval is adjustable by the system owner/operator.

In certain embodiments, step 710 is performed substantially synchronously with the receipt of the PFW signal in step 715. In these embodiments, upon receipt of a PFW signal, Applicants' method immediately determines the number of enqueued overlain second sectors and determines system capabilities, such as device adapter bandwidth. Based upon these determinations, Applicants' method sets an appropriate PFW time interval. In these synchronous embodiments, step 710 is performed by a sector format conversion device, such as device 220 (FIG. 2).

After receiving a PFW signal in step 715, Applicants' method transitions to both step 720 and step 730. In step 730, Applicants' method starts the PFW time interval set in step 715. In certain embodiments, step 730 is performed by a sector format conversion device, such as device 220 (FIG. 2). Applicants' method transitions from step 730 to step 735.

In step 720, Applicants' method completes the transmission of an already-overlain second sector, i.e. the (k)th overlain second sector. In certain embodiments, step 720 is performed by a sector format conversion device, such as device 220 (FIG. 2). Applicants' method transitions from step 720 to step 725 wherein the method sets an Inflight Indicator for the (k)th overlain second sector. In certain embodiments, step 725 is performed by a sector format conversion device, such as device 220 (FIG. 2). Applicants' method transitions from step 725 to step 735.

In step 735, Applicants' method forms one additional overlain second sector during the PFW time interval, namely the (k)th overlain second sector. Further in step 735, Applicants' method prefetches the next pre-existing second sector, i.e. the pre-existing (k)+1th second sector, and overlays the next first sector portion onto that pre-existing (k)+1th second sector to form an overlain (k)+1th second sector.

In step 740, Applicants' method saves the newly-formed (k)+1th overlain second sector, and any portion of the next first sector that was not overlain onto the pre-existing (k)+1th second sector, before loss of utility power. In certain embodiments, steps 740 further includes saving to nonvolatile memory the (k)+1th overlain second sector and any portion of the next first sector that was not overlain onto the pre-existing (k)+1th second sector. The saved portion of the next first sector that was not overlain onto the pre-existing (k)+1th second sector will be used after power restoration to form the (k)+2th overlain second sector.

In step 745, Applicants' method sets a data destage flag indicating that after power restoration data needs to be retrieved from nonvolatile memory. In certain embodiments, the data destage flag is disposed in microcode disposed in Applicants' sector format conversion device. In certain embodiments, the data destage flag is disposed in microcode disposed in Applicants' device controller, such as controller 210. In certain embodiments, step 745 is performed by Applicants sector format conversion device. In certain embodiments, step 745 is performed by Applicants' device controller.

In step 750, Applicants' method, throughout the power failure warning time interval, resets Inflight Indicators upon receipt of the corresponding write complete signals. In certain embodiments, step 750 is performed by Applicants' sector format conversion device. In certain embodiments, step 750 is performed by Applicants' device controller.

In step 755, Applicants' method determines if the power failure warning time interval is expired. In certain embodiments, step 755 is performed by Applicants' sector format conversion device. In certain embodiments, step 755 is performed by Applicants' device controller.

If Applicants' method determines in step 755 that the power failure warning time interval is not expired, then the method transitions from step 755 to step 750 and continues. Alternatively, if Applicants' method determines in step 755 that the power failure warning time interval is expired, then the method transitions from step 755 to step 760 wherein the method determines if any remaining Inflight Indicators are set to the second value, i.e. if any overlain second sectors remain In Flight. In certain embodiments, step 760 is performed by Applicants' sector format conversion device. In certain embodiments, step 760 is performed by Applicants' device controller.

If Applicants' method determines in step 760 that one or more overlain second sectors did not remain In Flight at the expiration of the power failure warning time interval, then the method transitions from step 760 to step 775. If Applicants' method determines in step 760 that one or more overlain second sectors remain In Flight at the expiration of the power failure warning time interval, then the method transitions from step 760 to step 765 wherein the method saves to nonvolatile memory, prior to utility power loss, each overlain second sector remaining In Flight at the expiration of the power failure warning time interval. In certain embodiments, step 765 is performed by Applicants' sector format conversion device. In certain embodiments, step 765 is performed by Applicants' device controller.

Applicants' method transitions from step 765 to step 770 wherein the method sets a data destage flag. In the event a data destage flag was set in step 745, then step 770 includes verifying that the data destage flag has been set. In certain embodiments, step 770 is performed by Applicants' sector format conversion device. In certain embodiments, step 770 is performed by Applicants' device controller.

Applicants' method transitions from step 770 to step 775 wherein utility power to Applicants' information storage and retrieval system is interrupted. Applicants' method transitions from step 775 to step 810 (FIG. 8).

Figure 8:
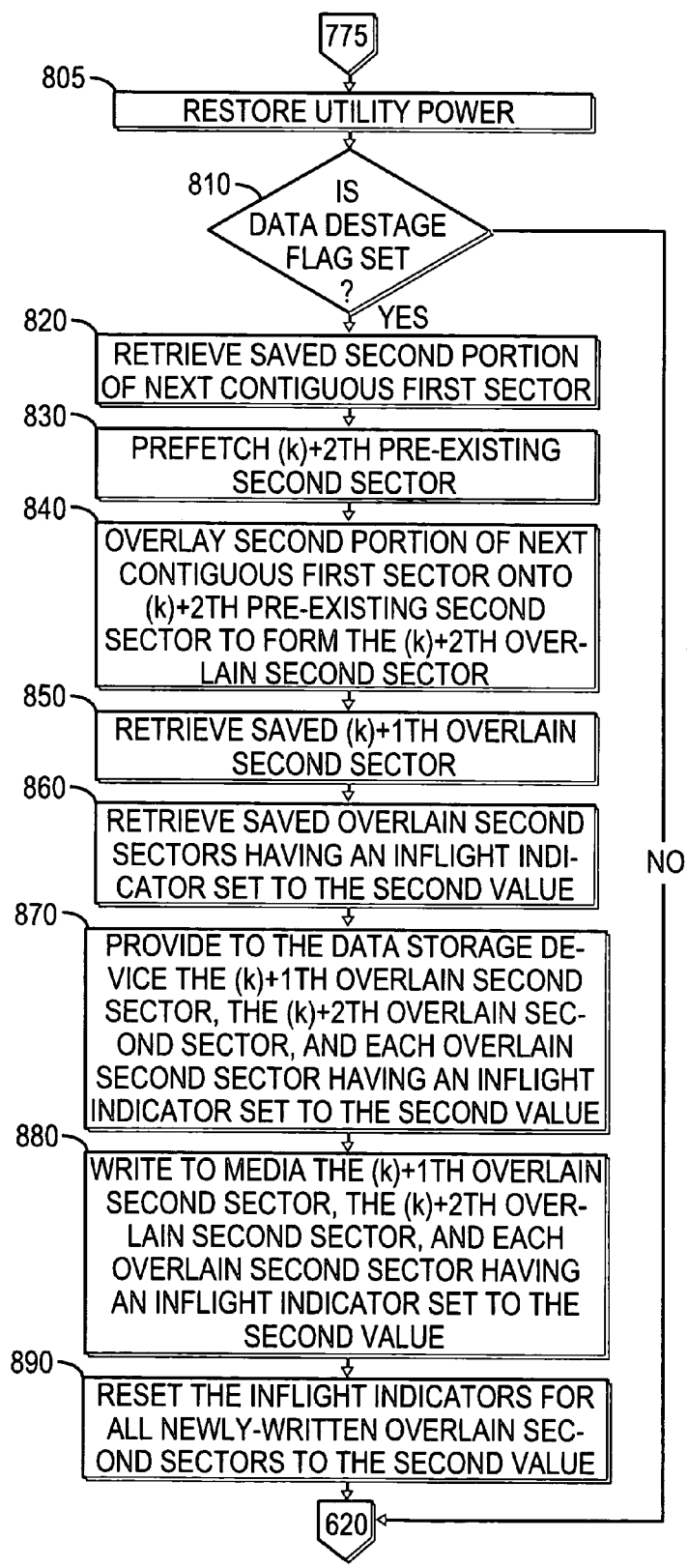
FIG. 8 is a flow chart summarizing additional steps in Applicants' power failure warning algorithm.

Referring now to FIG. 8, in step 805 utility power is restored to Applicants' information storage and retrieval system. In step 810, Applicants' method determines if a data destage flag is set. In certain embodiments, step 810 is performed by Applicants' sector format conversion device. In certain embodiments, step 810 is performed by Applicants' device controller.

If Applicants' method determines in step 810 that a data destage flag is not set, then Applicants' method transitions from step 810 to step 620 and continues as described above. Alternatively, if Applicants' method determines in step 810 that a data destage flag is set, then Applicants' method transitions from step 810 to step 820 wherein the method retrieves from nonvolatile memory the saved second portion of the next contiguous first sector. In certain embodiments, step 820 is performed by Applicants' sector format conversion device. In certain embodiments, step 820 is performed by Applicants' device controller.

Applicants' method transitions from step 820 to step 830 wherein the method prefetches the (k)+2th pre-existing second sector. In certain embodiments, step 830 is performed by Applicants' sector format conversion device. In certain embodiments, step 830 is performed by Applicants' device controller. Applicants' method transitions from step 830 to step 840 wherein the method overlays the second portion of the next contiguous first sector onto the (k)+2th pre-existing second sector to form the (k)+2th overlain second sector. In certain embodiments, step 840 is performed by Applicants' sector format conversion device. In certain embodiments, step 840 is performed by Applicants' device controller.

In step 850, Applicants' method retrieves from nonvolatile memory the saved (k)+1th overlain second sector. In certain embodiments, step 850 is performed by Applicants' sector format conversion device. In certain embodiments, step 850 is performed by Applicants' device controller.

In step 860, Applicants' method retrieves from nonvolatile memory each overlain second sector that remained In Flight at the expiration of the power failure warning time interval. In certain embodiments, step 860 is performed by Applicants' sector format conversion device. In certain embodiments, step 860 is performed by Applicants' device controller.

Steps 820, 850, and 860 may be performed in any order. Each of steps 820, 850, and 860, may be performed any time after step 810 and before step 870, wherein Applicants' method provides to the data storage device the (k)+1th overlain second sector, the (k)+2th overlain second sector, and each overlain second sector that remained In Flight at the expiration of the power failure warning time interval. In certain embodiments, step 870 is performed by Applicants' sector format conversion device. In certain embodiments, step 870 is performed by Applicants' device controller.

Applicants' method transitions from step 870 to step 880 wherein the method writes to media the (k)+1th overlain second sector, the (k)+2th overlain second sector, and each overlain second sector that remained In Flight at the expiration of the power failure warning time interval.

Applicants' method transitions from step 880 to step 890 wherein the method resets Inflight Indicators for each overlain second sector that remained In Flight at the expiration of the power failure warning time interval. Step 890 further includes reporting by the data storage device that each overlain second sector that remained In Flight at the expiration of the power failure warning time interval has been written to media. This reporting may comprise any signaling method known to those of skill in the art. For example, the data storage drive may be coupled to the issuing sector format conversion device through a communication interface. In certain embodiments, the data storage drive provides a write complete signal to the issuing sector format conversion device. Alternatively, in certain embodiments the issuing sector format conversion device polls the data storage device to ascertain the status of each overlain second sector that remained In Flight at the expiration of the power failure warning time interval.

Applicants' method transitions from step 890 to step 620 (FIG. 6), and continues as described above.

The following Example I is presented to further illustrate to persons skilled in the art how to make and use the invention and to identify a presently preferred embodiment thereof. This example is not intended as a limitation, however, upon the scope of the invention, which is defined only by the appended claims.

EXAMPLE I

Figure 9A:
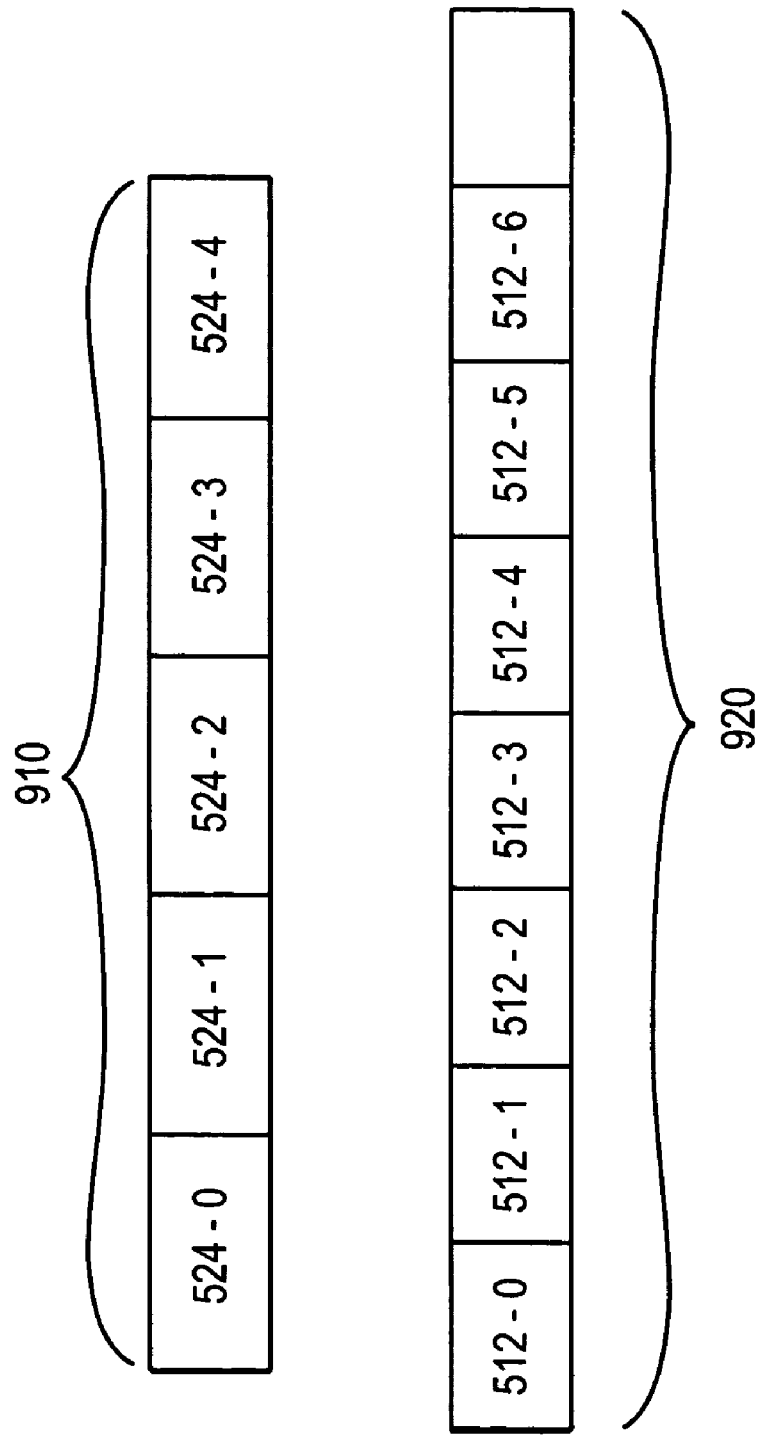
FIG. 9A is a block diagram showing a plurality of 524 byte first sectors being overlain onto a plurality of 512 byte second sectors.

Referring now to FIG. 9A, in this Example I Applicants' method is overlaying plurality of first sectors 910 onto plurality of second sectors 920. In this Example I, second sector sectors 512-0, 512-1, 512-2, and 512-3 have been overlain in step 620 (FIG. 6), enqueued in step 630 (FIG. 6), and transmitted to the data storage device in step 640 (FIG. 6).

Applicants' method is in the process of transmitting overlain second sector 512-4 when the sector format conversion device receives a power failure warning in step 715 (FIG. 7). In step 720 (FIG. 7), Applicants' method completes the transmission of overlain second sector 512-4, and in step 725 (FIG. 7) the method sets an Inflight Indicator for overlain second sector 512-4 to a second value.

Figure 9C:
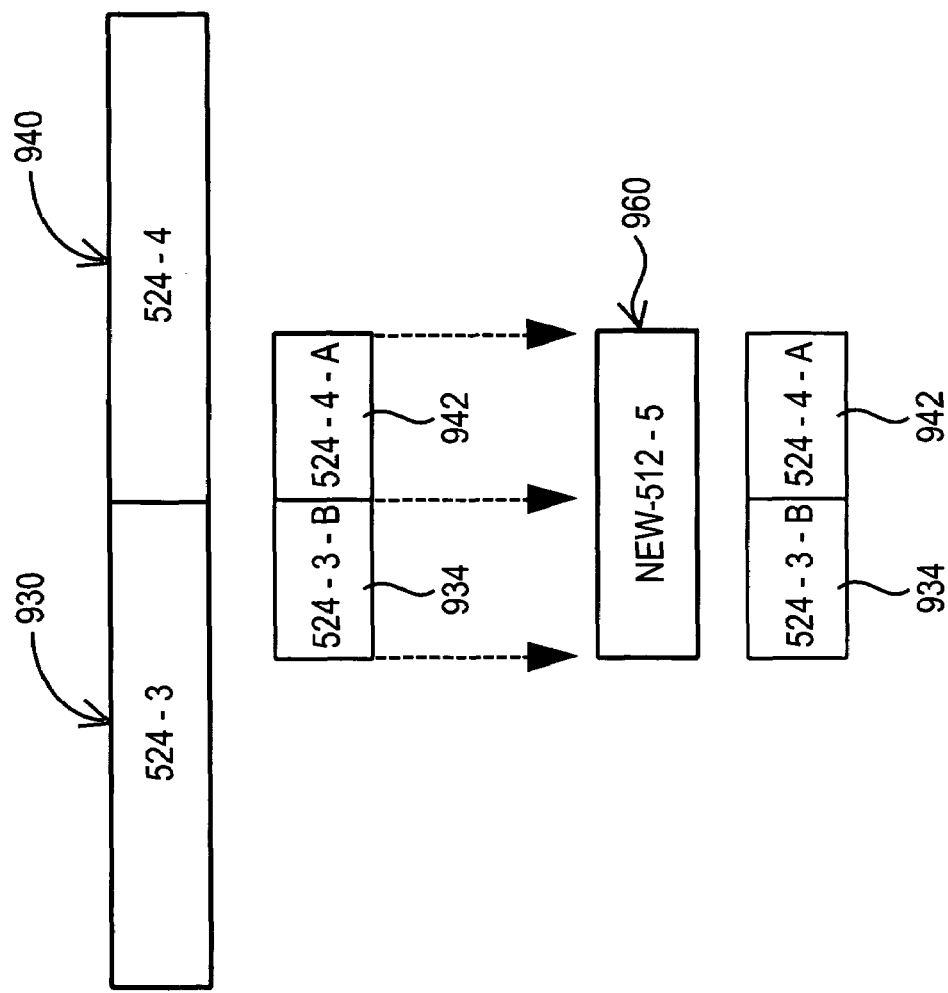
FIG. 9C is a block diagram illustrating a step in Applicants' power failure warning algorithm.

In step 735 (FIG. 7), Applicants' method forms one additional overlain second sector during the PFW time interval, namely in the illustrated embodiment of FIG. 9A overlain second sector 512-5. Further in step 735, and referring now to FIG. 9B, Applicants' method prefetches existing second sector 512-5 which comprises pre-existing data 950. Further in step 735 and referring now to FIG. 9C, Applicants' method overlays first sector portion 524-3-B and first sector portion 524-4-A onto pre-existing second sector 950 to form overlain second sector 512-5 which includes data 960. Data 960 includes data 934 and data 942.

In step 740 (FIG. 7), Applicants' method saves newly-formed overlain second sector 512-5, and sector portion 524-4-B, in nonvolatile memory disposed in Applicants' sector format conversion device prior to loss of utility power. Sector portion 524-4-B will be used after power restoration to form overlain second sector 512-6. In step 745, Applicants' method sets a data destage indicator.

At the expiration of the power failure warning time interval, write complete signals have not been received for overlain second sectors 512-1, 512-2, 512-3, or 512-4. In step 765 (FIG. 7), overlain second sectors 512-1, 512-2, 512-3, and 512-4, are saved to nonvolatile memory before loss of utility power. In step 770 (FIG. 7), Applicants' method verifies that a data destage indicator is set.

Figure 9E:
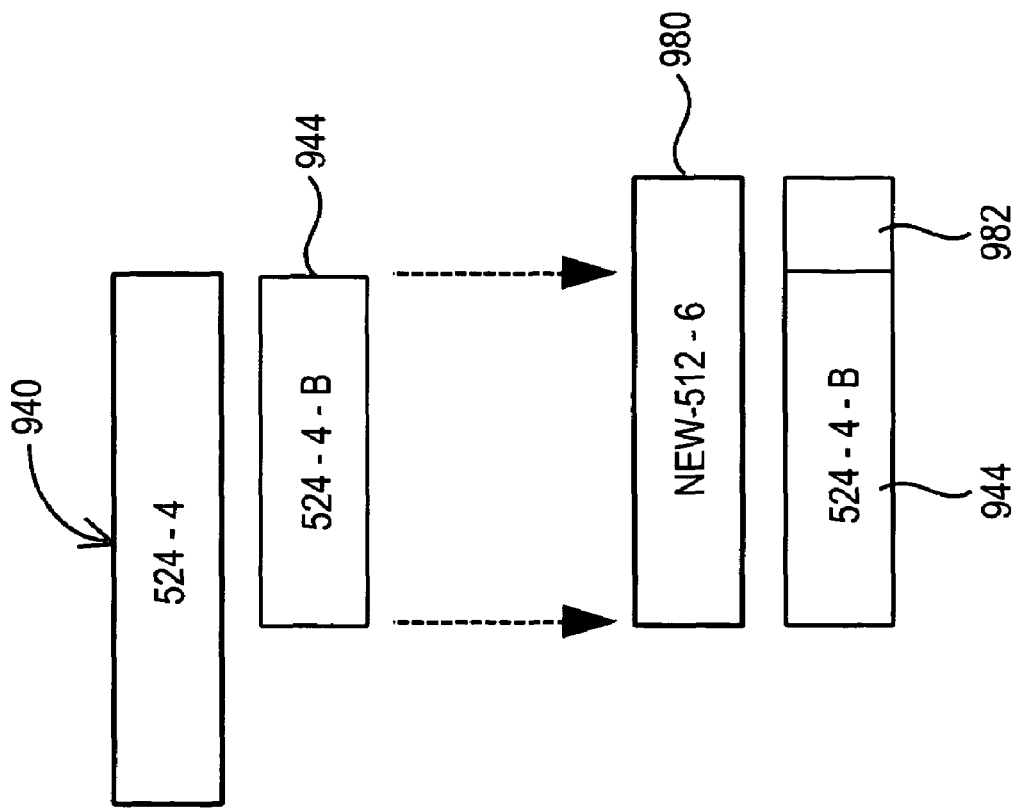
FIG. 9E is a block diagram illustrating a step in Applicants' power failure warning algorithm.

Referring now to FIG. 9D, after power restoration and in step 820 (FIG. 8), Applicants' method retrieves from nonvolatile memory the saved second portion, i.e. sector portion 524-4-B, of first sector 524-4. In step 830 (FIG. 8), Applicants' method prefetches pre-existing second sector 512-6 which comprises pre-existing data 970. Referring to FIG. 9E, in step 840 (FIG. 8) Applicants' method overlays first sector portion 524-4-B onto pre-existing second sector 512-6 to form the (k)+2th overlain second sector, i.e. overlain second sector 512-6 which includes data 980. Data 980 includes data 944 and pre-existing data 982.

In step 850 (FIG. 8), Applicants' method retrieves from nonvolatile memory the (k)+1th overlain second sector. In step 860 (FIG. 8), Applicants' method retrieves from nonvolatile memory overlain second sectors 512-1, 512-2, 512-3, and 512-4.

In step 870 (FIG. 8), Applicants' method provides to the data storage device overlain second sectors 512-1, 512-2, 512-3, 512-4, 512-5, and 512-6. In step 880, Applicants' method writes to media overlain second sectors 512-1, 512-2, 512-3, 512-4, 512-5, and 512-6. In step 890 (FIG. 8), Applicants' method resets the Inflight Indicators for overlain second sectors 512-1, 512-2, 512-3, 512-4.

The embodiments of Applicants' method recited in FIGS. 3, 6, 7, and/or 8, may be implemented separately. Moreover, in certain embodiments, individual steps recited in FIGS. 3, 6, 7, and/or 8, may be combined, eliminated, or reordered.

In certain embodiments, Applicants' invention includes instructions residing in memory, such as for example memory 214 (FIG. 2), memory 226 (FIG. 2), memory 246 (FIG. 2), memory 266 (FIG. 2), and/or memory 286 (FIG. 2), where those instructions are executed by processor 212 (FIG. 2), 224 (FIG. 2), 244 (FIG. 2), 264 (FIG. 2), and/or 284 (FIG. 2), respectively, to performs steps 310, 320, 330, and 340, recited in FIG. 3, and/or steps 610, 620, 625, 630, 635, 640, 645, 650, 660, 670, 680, and/or 690, recited in FIG. 6, and/or steps 710, 715, 720, 725, 730, 735, 740, 745, 750, 755, 760, 765, 770, and/or 775, recited in FIG. 7, and/or steps 810, 820, 830, 840, 850, 860, 870, 880, and/or 890, recited in FIG. 8.

In other embodiments, Applicants' invention includes instructions residing in any other computer program product, where those instructions are executed by a computer external to, or internal to, system 100, to performs steps 310, 320, 330, and 340, recited in FIG. 3, and/or steps 610, 620, 625, 630, 635, 640, 645, 650, 660, 670, 680, and/or 690, recited in FIG. 6, and/or steps 710, 715, 720, 725, 730, 735, 740, 745, 750, 755, 760, 765, 770, and/or 775, recited in FIG. 7, and/or steps 810, 820, 830, 840, 850, 860, 870, 880, and/or 890, recited in FIG. 8. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to overlay (n) first sectors onto (m) second sectors using a data queue, comprising the steps of:
   providing an information storage and retrieval system which includes information comprising a plurality of first sectors written in a first sector format; a device controller; a data storage device, wherein said data storage device comprises an information storage medium comprising a plurality of second sectors each comprising a second sector format; a sector format conversion device comprising a data queue, a buffer, and nonvolatile, memory; a communication link interconnecting said sector format conversion device and said device controller; wherein said sector format conversion devices is interconnected with said data storage device;
   providing a plurality of Inflight Indicators, wherein each Inflight Indicator comprises either a first value or a second value, and wherein the (i)th Inflight Indicator is associated with the (j)th overlain second sector;
   setting a power failure warning time interval;
   providing (N) contiguous first sectors to said sector format conversion device, wherein said (N) first sectors include a beginning first sector and a first number of bytes;
   determining that (M) contiguous second sectors comprise at least said first number of bytes, wherein said (M) contiguous sectors comprise a beginning second sector and an ending second sector;
   overlaying by said sector format conversion device the (i)th first sector onto part or all of the (j)th pre-existing second sector to form the (j)th overlain second sector, wherein (i) is greater than or equal to (N), and wherein (j) is greater than or equal to 1 and less than or equal to (M);
   enqueuing said (j)th overlain second sector in said data queue;
   transmitting said (j)th overlain second sector to said data storage device;
   setting the (j)th Inflight Indicator to a second value when transmitting said (i)th overlain second sector to said data storage device;
   writing said (j)th overlain second sector to said information storage medium;
   generating a (j)th Write Complete Signal by said data storage device after writing said (j)th overlain second sector to said information storage medium;
   resetting the (j)th Inflight Indicator to said first value upon receiving the (j)th Write Complete Signal,
   determining if a power failure warning has been received;
   operative if a power failure warning is received:
   starting said power failure warning time interval;
   monitoring the status of each Inflight overlain second sector;
   determining if said power failure warning time interval is expired;
   operative if said power failure warning time interval is expired:
   saving to nonvolatile memory each overlain second sector for which a write complete signal was not received prior to the expiration of said power failure warning time interval;
   losing utility power to said information storage and retrieval system;
   restoring utility power to said information storage and retrieval system;
   retrieving from nonvolatile memory each overlain second sector for which a write complete signal was not received prior to the expiration of said power failure warning time interval; and
   providing to said data storage device each overlain second sector for which a write complete signal was not received prior to the expiration of said power failure warning time interval;
   writing to media each overlain second sector for which a write complete signal was not received prior to the expiration of said power failure warning time interval.

2. The method of claim 1, further comprising, the steps of:
   completing the transmission of an already-overlain second sector to said data storage device, wherein said power failure warning was received during that transmission;
   setting an Inflight Indicator for that transmitted, already-overlain second sector.

3. The method of claim 2, further comprising the step of setting said power failure warning time interval equal to about 3 milliseconds.

4. The method of claim 3, further comprising the step of providing utility power to said information storage and retrieval system for 4 milliseconds or longer after receiving said power failure warning.

5. The method of claim 1, further comprising the steps of:
   upon restoration of utility power to said information storage and retrieval system, determining if the (k)th Inflight Indicator is set to said second value;
   operative if the (k)th Inflight Indicator is set to said second value, retrieving the (k)th overlain second sector.

6. An article of manufacture comprising a computer readable medium having computer readable program code disposed therein to overlay (N) first sectors onto (M) second sectors using a data queue, said article of manufacture further comprising information comprising a plurality of first sectors written in a first sector format, a plurality of Inflight Indicators, wherein each Inflight Indicator comprises either a first value or a second value a device controller, a data storage device, wherein said data storage device comprises an information storage medium comprising a plurality of second sectors each comprising a second sector format, a sector format conversion device comprising a data queue, a buffer, and nonvolatile memory, a communication link interconnecting said sector format conversion device and said device controller, wherein said sector format conversion devices is interconnected with said data storage device, the computer readable program code comprising a series of computer readable program steps to effect:

provide (N) contiguous first sectors to said sector format conversion device, wherein said (N) first sectors include a beginning first sector and a first number of bytes;

determining that (M) contiguous second sectors comprise at least said first number of bytes, wherein said (M) contiguous second sectors comprise a beginning second sector and an ending second sector;

overlaying by said sector format conversion device the (i)th first sector onto part or all of the (j)th pre-existing second sector to form the (j)th overlain second sector, wherein (i) is greater than or equal to (N), and wherein (j) is greater than or equal to 1 and less than or equal to (M);

associating the (j)th Inflight Indicator with the (j)th overlain second sector;

enqueuing said (j)th overlain second sector in said data queue;

transmitting said (j)th overlain second sector to said data storage device;

setting the (j)th Inflight Indicator to a second value when transmitting said (j)th overlain second sector to said data storage device;

writing said (j)th overlain second sector to said information storage medium;

generating the (j)th write complete signal by said data storage device after writing said (j)th overlain second sector data payload to said information storage medium;

resetting the (j)th Inflight Indicator to said first value upon receiving the (i)th write complete signal;

determining if a power failure warning has been received;

operative if a power failure warning is received:

obtaining a power failure warning time interval;

starting said power failure warning time interval;

monitoring the status of Inflight overlain second sectors;

determining if said power failure warning time interval is expired;

operative if said power failure warning time interval is expired:

saving to nonvolatile memory before loss of utility power each overlain second sector for which a write complete signal was not received prior to the expiration of said power failure warning time interval;

after restoration utility power to said information storage and retrieval system:

retrieving from nonvolatile memory each overlain second sector for which a write complete signal was not received prior to the expiration of said power failure warning time interval;

providing to said data storage device each overlain second sector for which a write complete signal was not received prior to the expiration of said power failure warning time interval;

writing to media each overlain second sector for which a write complete signal was not received prior to the expiration of said power failure warning time interval.

7. The article of manufacture of claim 6, said computer readable program code further comprising a series of computer readable program steps to effect:

completing the transmission of an already-overlain second sector to said data storage device, wherein said power failure warning was received during that transmission;

setting an Inflight Indicator for that transmitted, already-overlain second sector.

8. The article of manufacture of claim 7, said computer readable program code further comprising a series of computer readable program steps to effect setting said power failure warning time interval equal to about 3 milliseconds.

9. The article of manufacture of claim 6, said computer readable program code further comprising a series of computer readable program steps to effect:

upon restoration of utility power to said information storage and retrieval system, determining if the (k)th Inflight Indicator is set to said second value;

operative if the (k)th Inflight Indicator is set to said second value, retrieving the (k)th overlain second sector.

10. A computer program product embodied in an information storage medium, said computer program product being usable with a programmable computer processor to overlay (N) first sectors onto (M) second sectors using a data queue in an information storage and retrieval system comprising information comprising a plurality of first sectors written in a first sector format, a plurality of Inflight Indicators, wherein each Inflight Indicator comprises either a first value or a second value, a device controller, a data storage device, wherein said data storage device comprises an information storage medium comprising a plurality of second sectors each comprising a second sector format, a sector format conversion device comprising a data queue, a buffer, and nonvolatile memory, a communication link interconnecting said sector format conversion device and said device controller, wherein said sector format conversion devices is interconnected with said data storage device, comprising:

computer readable program code which causes said programmable computer processor to provide (N) contiguous first sectors to said sector format conversion device, wherein said (N) first sectors include a beginning first sector and a first number of bytes;

computer readable program code which causes said programmable computer processor to determine that (M) contiguous second sectors comprise at least said first number of bytes, wherein said (M) contiguous sectors comprise a beginning second sector and an ending second sector;

computer readable program code which causes said programmable computer processor to overlay by said sector format conversion device the (i)th first sector onto part or all of the (j)th second sector to form the (j)th overlain second sector;

computer readable program, code which causes said programmable computer processor to associate the (j)th Inflight Indicator with the (j)th overlain second sector;

computer readable program code which causes said programmable computer processor to enqueue said (j)th overlain second sector in said data queue;

computer readable program code which causes said programmable computer processor to transmit said (j)th overlain second sector to said data storage device;

computer readable program code which causes said programmable computer processor to set the (j)th Inflight Indicator to a second value when transmitting said (j)th overlain second sector to said data storage device;

computer readable program code which causes said programmable computer processor to write said (j)th overlain second sector to said information storage medium;

computer readable program code which causes said programmable computer processor to generate the (j)th write complete signal by said data storage device after writing said (j)th overlain second sector to said information storage medium;

computer readable program code which causes said programmable computer processor to reset the (j)th Inflight Indicator to said first value upon receiving the (j)th write complete signal, computer readable program code which causes said programmable computer processor to determine if a power failure warning has been received;

computer readable program code which causes said programmable computer processor to operative if a power failure warning is received:

obtaining a power failure warning time interval;

starting said power failure warning time interval;

monitoring the status of Inflight overlain second sectors;

determining if said power failure warning time interval is expired;

computer readable program code which, if said power failure warning time interval is expired, causes said programmable computer processor to saving to nonvolatile memory before loss of utility power each overlain second sector for which a write complete signal was not received prior to the expiration of said power failure warning time interval;

computer readable program code which, after restoration utility power to said information storage and retrieval system, causes said programmable computer processor to:

retrieve from nonvolatile memory each overlain second sector for which a write complete signal was not received prior to the expiration of said power failure warning time interval;

provide to said data storage device each overlain second sector for which a write complete signal was not received prior to the expiration of said power failure warning time interval; and write to media each overlain second sector for which a write complete signal was not received prior to the expiration of said power failure warning time interval.

11. The computer program product of claim 10, further comprising:

computer readable program code which causes said programmable computer processor to complete the transmission of an already-overlain second sector to said data storage device, wherein said power failure warning was received during that transmission;

computer readable program code which causes said programmable computer processor to set an Inflight Indicator for that transmitted, already-overlain second sector.

12. The computer program product of claim 10, further comprising:

computer readable program code which, after restoration of utility power to said information storage and retrieval system, causes said programmable computer processor to determine if the (k)th Inflight Indicator is set to said second value;

computer readable program code which, if the (k)th Inflight Indicator is set to said second value, causes said programmable computer processor to retrieve from nonvolatile memory the (k)th overlain second sector.

13. The computer program product of claim 12, further comprising computer readable program code which causes said programmable computer processor to set said power failure warning time interval equal to about 3 milliseconds.

* * * * *